United States Patent [19]
Sakano et al.

[11] Patent Number: 5,473,444
[45] Date of Patent: Dec. 5, 1995

[54] IMAGE PROCESSING DEVICE HAVING FUNCTION OF DETECTING DOTTED-IMAGE AREA

[75] Inventors: Yukio Sakano, Fuchu; Hiromi Okubo, Yokohama, both of Japan

[73] Assignee: Ricoh Company, Ltd., Tokyo, Japan

[21] Appl. No.: 412,223

[22] Filed: Mar. 27, 1995

Related U.S. Application Data

[63] Continuation of Ser. No. 135,519, Oct. 13, 1993, abandoned.

[30] Foreign Application Priority Data

Oct. 15, 1992 [JP] Japan .................................. 4-277335

[51] Int. Cl.⁶ ................................................... H04N 1/40
[52] U.S. Cl. .......................... 358/461; 358/462; 358/455
[58] Field of Search ...................................... 358/456, 461, 358/464, 465, 261.1, 261.2, 453, 462, 455; 382/176, 199

[56] References Cited

U.S. PATENT DOCUMENTS

| | | | |
|---|---|---|---|
| 4,503,556 | 3/1985 | Scherl et al. | 382/9 |
| 4,547,811 | 10/1985 | Ochi et al. | 382/176 |
| 5,202,771 | 4/1993 | Murayama | 358/261.1 |
| 5,278,919 | 1/1994 | Sugiura et al. | 358/465 |

FOREIGN PATENT DOCUMENTS 276966 12/1991 Japan .

Primary Examiner—Edward L. Coles, Sr.
Assistant Examiner—Kimberly A. Williams
Attorney, Agent, or Firm—Popham, Haik, Schnobrich & Kaufman, Ltd.

[57] ABSTRACT

An image processing device includes a first unit for detecting a pixel at which a predetermined local variation of image data occurs, a second unit for detecting a density relating to the above pixel within a predetermined scanning area, and a third unit for determining whether or not the image data forms a dotted-image area on the basis of the density detected by the second unit.

6 Claims, 14 Drawing Sheets

FIG. 8
WHITE-BACKGROUND PIXEL DETECTION
| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |
( 1 & 2 & 3 & 4 & 5 & 6 & 7 & 8 & 9 &10) |
( 6 & 7 & 8 & 9 &10&11&12&13&14&15) |
(11&12&13&14&15&16&17&18&19&20) |
(16&17&18&19&20&21&22&23&24&25) |
( 2 & 7 &12&17&22& 3 & 8 &13&18&23) |
( 3 & 8 &13&18&23& 4 & 9 &14&19&24) |
FIG. 9
BLOCK FORMING
FIG. 10
EXPANSION
FIG. 11
CORRECTION
| 1 | 2 | 3 | 4 | 5 | 6 | 7 | ☒ | 8 | 9 | 10 | 11 | 12 | 13 | 14 |
( 1 | 2 | 3 | 4 | 5 | 6 | 7 ) & ( 8 | 9 | 10 | 11 | 12 | 13 | 14 )

IMAGE PROCESSING DEVICE HAVING FUNCTION OF DETECTING DOTTED-IMAGE AREA

This is a continuation of U.S. patent application Ser. No. 08/135,519, filed Oct. 13, 1993, now abandoned.

BACKGROUND OF THE INVENTION

1. Background of the Invention

The present invention generally relates to image processing devices such as digital copying machines and facsimile machines, and more particularly to an image processing device having a function of detecting a dotted-image area.

2. Description of the Prior Art

An image processing device having the function of detecting a dotted-image area is proposed in, for example, Japanese Laid-Open Patent Application No. 3-276966. In the above image processing device, information indicating a ratio of a dotted-image area to a predetermined local area of an image indicated by digital multivalue data is referred to in order to detect polar pixels located at upward and downward peaks (local maximum and local minimum) at which the ratio of the dotted-image area to the local area is changed. Then, it is determined whether predetermined pixels within a small area form a dotted-image candidate area or a non-dotted-image candidate area on the basis of an existence state of the polar pixels located at the above upward and downward peaks. Thereafter, a dotted-image area is detected from the dotted-image area candidate area.

However, the above image processing device has the following disadvantages. First, a hardware configuration for realizing the above dotted-image area detecting function is very complex and expensive because a circuit logic for detecting the polar pixels located at the upward and downward peaks at which the ratio in the local area is changed must be formed by a hardware configuration. Second, the upward and downward peaks cannot be detected precisely. Particularly, when the ratio of the dotted-image area to the local area is equal to a certain level, the upward and downward peaks cannot correctly be detected.

SUMMARY OF THE INVENTION

It is a general object of the present invention to provide an image processing device in which the above disadvantages are eliminated.

A more specific object of the present invention is to provide an image processing device capable of correctly detecting a dotted-image area with a simple hardware configuration.

The above objects of the present invention are achieved by an image processing device comprising:

first means for detecting a pixel at which a predetermined local variation of image data occurs;

second means for detecting a density relating to the above pixel within a predetermined scanning area; and third means for determining whether or not the image data forms a dotted-image area on the basis of the density detected by the second means.

BRIEF DESCRIPTION OF THE DRAWINGS

Other objects, features and advantages of the present invention will become more apparent from the following detailed description when read in conjunction with the accompanying drawings, in which:

FIG. 8 is a diagram showing the operating logic of a white-background pixel detector shown in FIG. 7:

FIG. 9 is a diagram showing the operating logic of a blocking unit shown in FIG. 7;

FIG. 10 is a diagram showing the operating logic of an expansion unit shown in FIG. 7;

FIG. 11 is a diagram showing the operating logic of a correction unit shown in FIG. 7;

DESCRIPTION OF THE PREFERRED EMBODIMENTS

Figure 2:
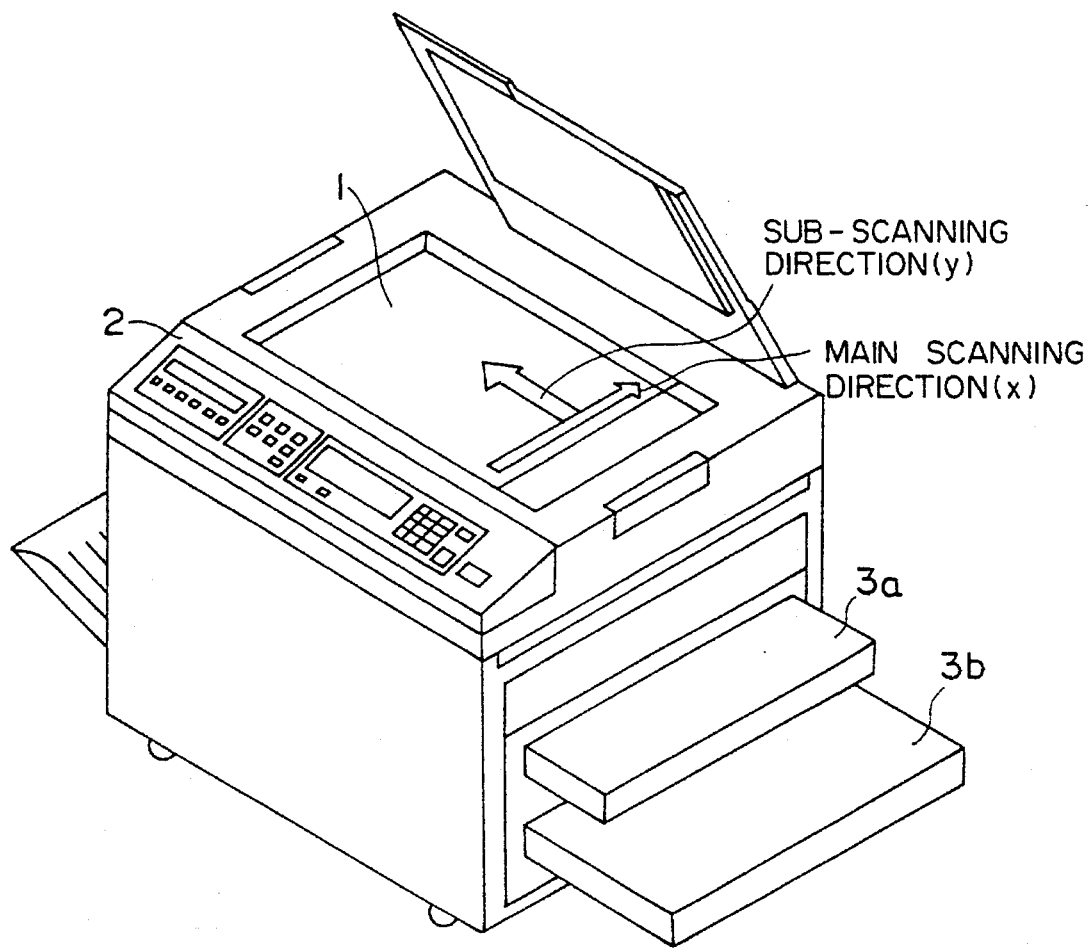
FIG. 2 is a perspective view of an outer appearance of a digital copying machine to which the present invention is applied.

First, a description will now be given, with reference to FIGS. 2 through 4, of a digital copying machine to which the present invention is applied. An original is placed on an original plate (exposure glass plate) 1. The original is optically read by a CCD line sensor of a reader unit 4 under a condition previously set by means of an operating unit 2, so that the original is represented by pixels of 400 dpi (dots per inch). During the above read operation, the original is read in a main scanning direction (x) by the CCD line sensor and is read in a sub-scanning direction (y) by means of a relative movement in which the original is moved in the sub-scanning direction.

Figure 3:
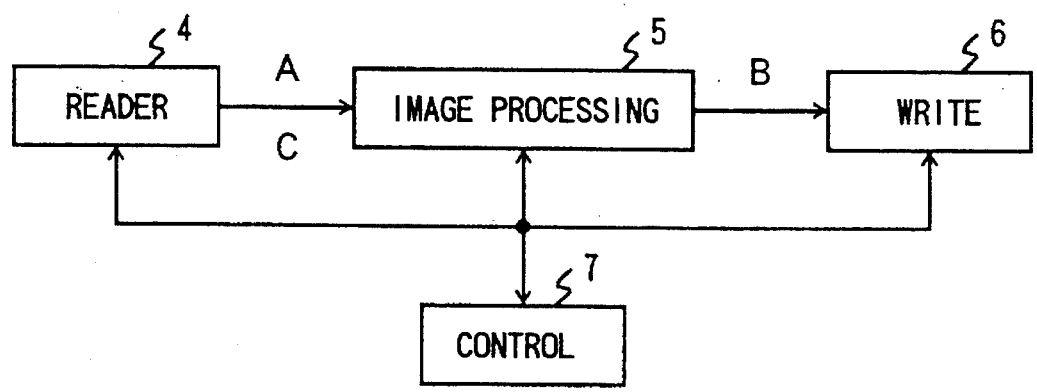
FIG. 3 is a block diagram of an outline of a circuit system of the digital copying machine shown in FIG. 2.

The reader unit 4 shown in FIG. 3 amplifies the image signal from the CCD line sensor and converts the amplified image signal into a quantized digital signal. Density information is also quantized. In the quantizing process, data expressed in a range of 256 gradation levels (black=zero, white=255) is generated. Then, a shading correction is carried out for the digital signal thus generated. The digital signal after the shading correction is carried out is applied, as image data A, to the image processing unit 5 shown in FIG. 4.

Figure 1:
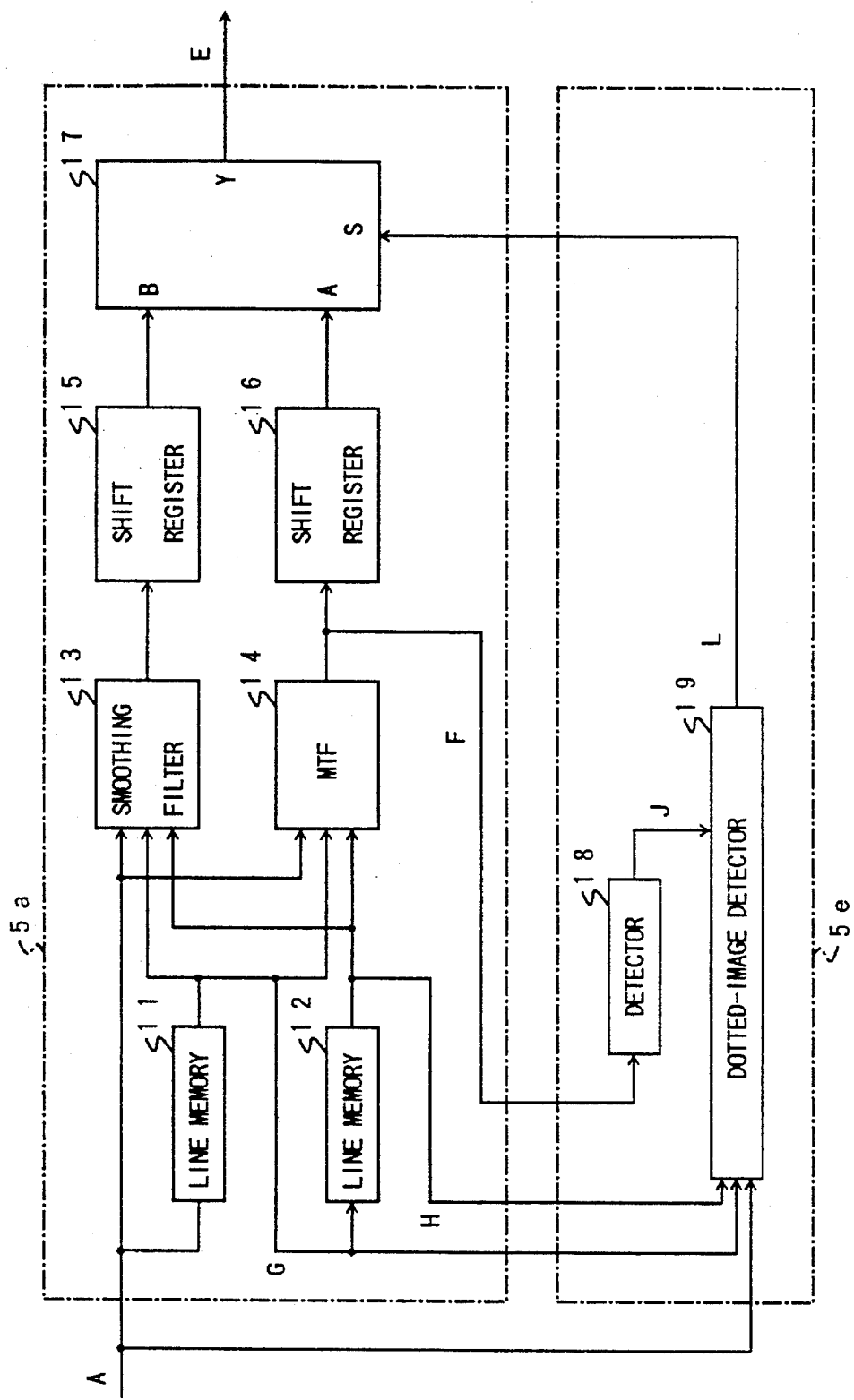
FIG. 1 is a block diagram of an embodiment of an image processing device according to the present invention.

The image processing unit 5 performs various image process operations by means of a filter 5a, a magnification changing (scaling) unit 5b, a gamma-conversion unit 5c, a gradation processing unit 5d, and a dotted-image separation unit 5e shown in FIG. 1 in detail. The output data B of the image processing unit 5 is recorded on a sheet fed from a sheet cassette 3a or 3b by means of a write unit 6 shown in FIG. 3. The write unit 6 is, for example, a laser beam printer of a conventional electrophotographic system, and reproduces a copy image with a pixel density of 400 dpi on the basis of the image data B. A controller 7 shown in FIG. 3 controls the reader unit 4, the image processing unit 5 and the write unit 6 on the basis of a control signal C.

The magnification changing unit 5b, the gamma-conversion unit 5c and the gradation processing unit 5d are conventional circuits. The filter characteristics of the filter 5a are switched in response to a dotted-image separation result signal L (dotted-image: L=1) from the dotted-image separation unit 5e. A dotted-image separation unit 5e determines whether or not image data A forms a dotted-image on the basis of image data A and data delayed one or two lines by the filter 5a.

Figure 4:
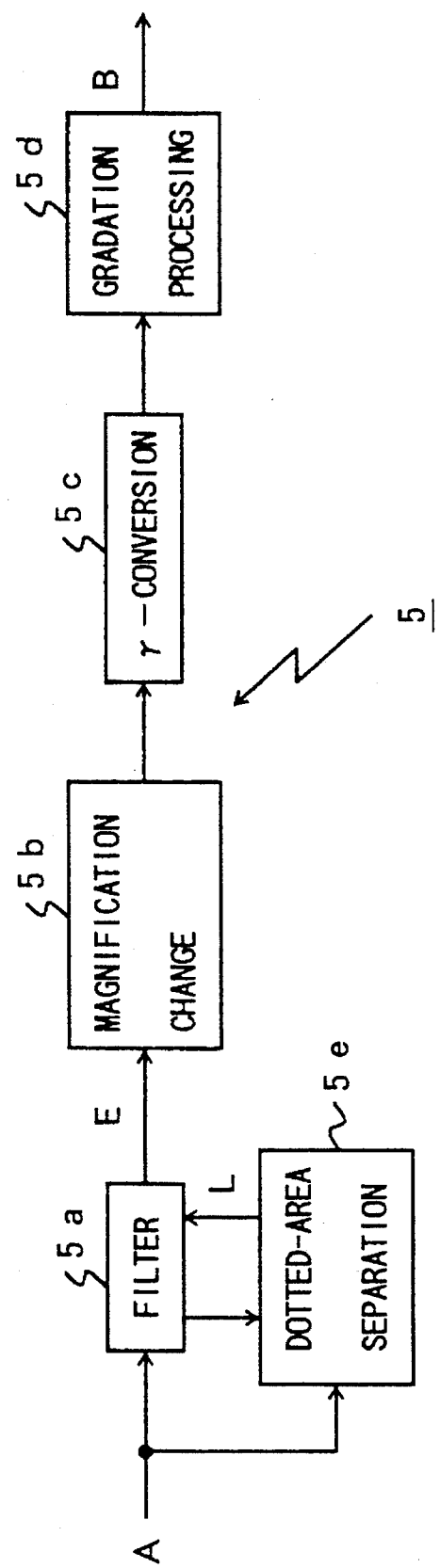
FIG. 4 is a block diagram of an image processing unit shown in FIG. 3.
Figure 5:
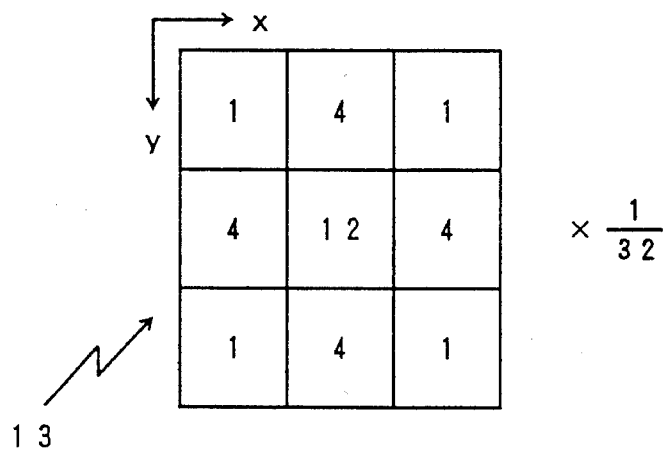
FIG. 5 is a diagram for explaining a weighting matrix of weighting values of a smoothing filter shown in FIG. 1.
Figure 6:
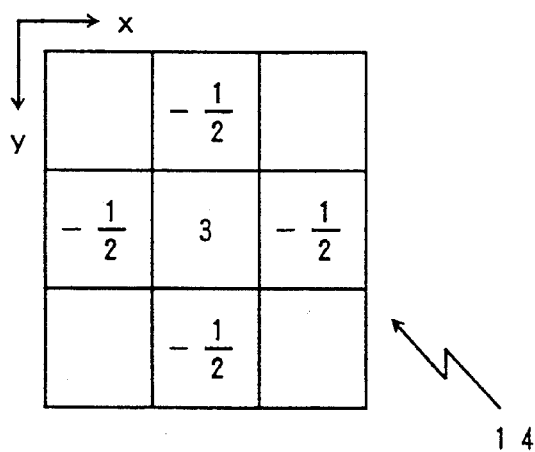
FIG. 6 is a diagram for explaining a weighting of an MTF correction filter.

FIG. 1 shows the filter 5a and the dotted-image separation unit 5e shown in FIG. 4. Signals A, E and L shown in FIG. 1 are the same as those shown in FIG. 5. The filter 5a delays image data A by a time equal to one line by means of a line memory 11. Delayed data G output from the line memory 11 is delayed by a delay time representing one line by a line memory 12, so that data H is output from the line memory 12. The data A, G and H equal to three lines are applied to a smoothing filter 13, an MTF correction (edge emphasis) filter 14, and a dotted-image detector 19 provided in the dotted-image separation unit 5e. The smoothing filter 13 has a weighting matrix (factor values) for 3×3 pixels as shown in FIG. 5, the weighting matrix (factor values) functioning to smooth pixels located at the center of the 3×3 matrix. The MTF correction filter 14 has a weighting matrix as shown in FIG. 6 having values with respect to upper, lower, right, left and center pixels of the 3×3 matrix. The weighting matrix shown in FIG. 6 emphasizes the pixel located at the center of the 3×3 matrix.

The data processed by the smoothing filter 13 and the MTF correction filter 14 are respectively shifted by shift registers 15 and 16 so that these data signals are synchronized with the dotted-image separation result signal L. Then, the shifted data signals from the shift registers 15 and 16 are applied to a selector 17, which selects either the data signal from the shift register 15 or the data signal from shift register 16 on the basis of the dotted-image separation result signal L. A selected data signal E from the selector 17 is output to the magnification changing unit 5b shown in FIG. 4. When the signal L indicates 1, the selector 17 selects the shift register 15 connected to the smoothing filter 13. When the signal L indicates 0, the selector 17 selects the shift register 16 connected to the MTF correction filter 14.

Figure 7:
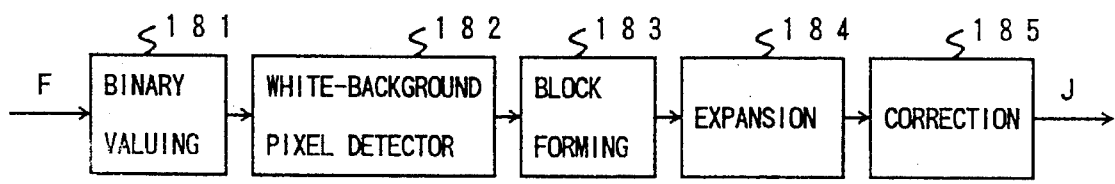
FIG. 7 is a block diagram of a white-background detector shown in FIG. 1.

Data F edge-emphasized by the MTF correction filter 14 is applied to a white-background detector 18 in the dotted-image separation unit 5e. As shown in FIG. 7, a binary-valuing (binarizing) unit 181 of the white-background detector 18 converts the edge-emphasized data F into binary-valued data (1 for white, 0 for black) on the basis of a predetermined threshold value. The binary-valued data from the unit 181 is output to a white-background detector 182, which detects white-background pixels according to an algorithm as shown in FIG. 8.

The numbers shown in FIG. 8 indicate pixel positions in a matrix consisting of 5×5 pixels, and assume either 1 (white) or 0 (black). In FIG. 8, symbol "&" denotes an AND operator, and symbol "|" denotes an OR operator. For example, (1&2&3&4&5&6&7&8&9&10) means an AND operation on the pixels located at positions "1" through "10". When all the values of the pixels "1" through "10" are binary ones, the central pixel "13" is white.

A block-data arranging unit 183 of the white-background detector 18 shown in FIG. 7 forms a block of 4×1 pixels arranged in the main scanning direction, and sets this block to a white-background block when at least one pixel in the block is a white pixel, as shown in FIG. 9. Thereafter, as shown in FIG. 10, an expansion unit 184 shown in FIG. 7 sets 1×3 blocks arranged in the sub-scanning direction to a white-background block when at least one of the 1×3 blocks is a white-background block.

As shown in FIG. 11, a correction unit 185 shown in FIG. 7 refers to blocks "1" through "14" arranged in the main scanning direction other than the white-background blocks set by the expansion unit 184. When at least one of the blocks "1" through "7" is a white-background block and at least one of the blocks "8" through "14" is a white-background block, the block located at the center of the arrangement and indicated by "x" in FIG. 11 is corrected to a white-background block. Hence, even if a character is present in the white background, it is possible to detect the block as a white-background block by the above-mentioned correction process. The correction unit 185 outputs a white-background detection signal J (=1) to the dotted-image detector 19.

A description will now be given, with reference to FIGS. 12 through 17, of the dotted-image detector 19.

In the following description, the aforementioned data A, G and H representing three lines, and the white-background detection signal J will be considered. Further, some parameters will be defined as follows. Data $_AY$ denotes a variation amount of pixel data in the sub-scanning direction. A signal $P_y$ is a variation-point presence/non-presence signal, which is switched to 1, indicating that there is a variation point, when the variation amount $_AY$ in the sub-scanning direction $_AY$ is equal to or greater than a predetermined value. A signal $P_y'$ is a signal obtained by expanding the variation-point presence/non-presence signal $P_y$ in the main scanning direction. Data $_AX$ denotes a variation amount of image data in the main scanning direction. A signal $P_x$ is a variation-point presence/non-presence signal, which is switched to 1 when a peak is detected in the main scanning direction.

Figure 12:
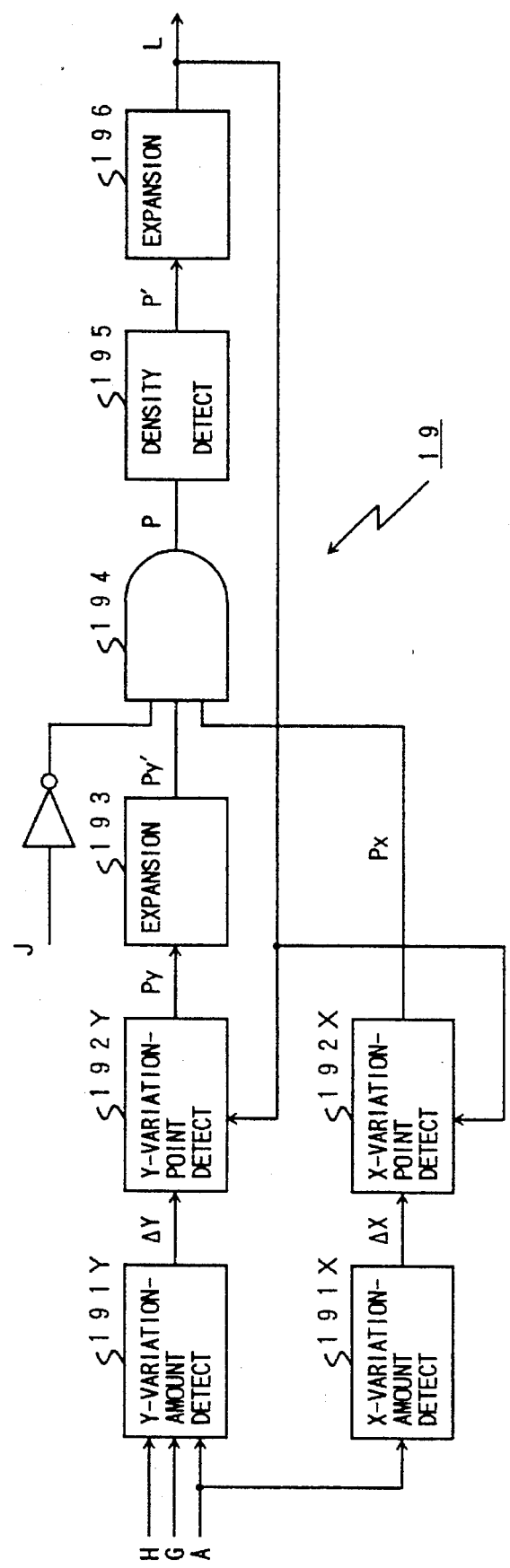
FIG. 12 is a block diagram of a dotted-image detector shown in FIG. 1.

Further, referring to FIG. 12, a signal P is generated by performing, by means of an AND gate 194, an AND logic operation on the inverted version (/J) of the white-background detection signal J (symbol "/" denotes an inverted signal except for division), the expanded signal $P_y'$, and the variation presence/non-presence signal $P_x'$. That is, the signal P is equal to 1 when an area other than a white-background area is being processed and there is an expansion in a Y variation point (in the sub-scanning direction) and an X variation (in the main scanning direction). When at least a predetermined number of P=1 signals are present in a predetermined section in the main scanning direction, an output signal P' of a density detector 195 is switched to 1, and a signal obtained by expanding P'=1 in the main scanning direction and the sub-scanning direction is the aforementioned dotted-image detection signal L generated by an expansion unit 196.

Figure 13:
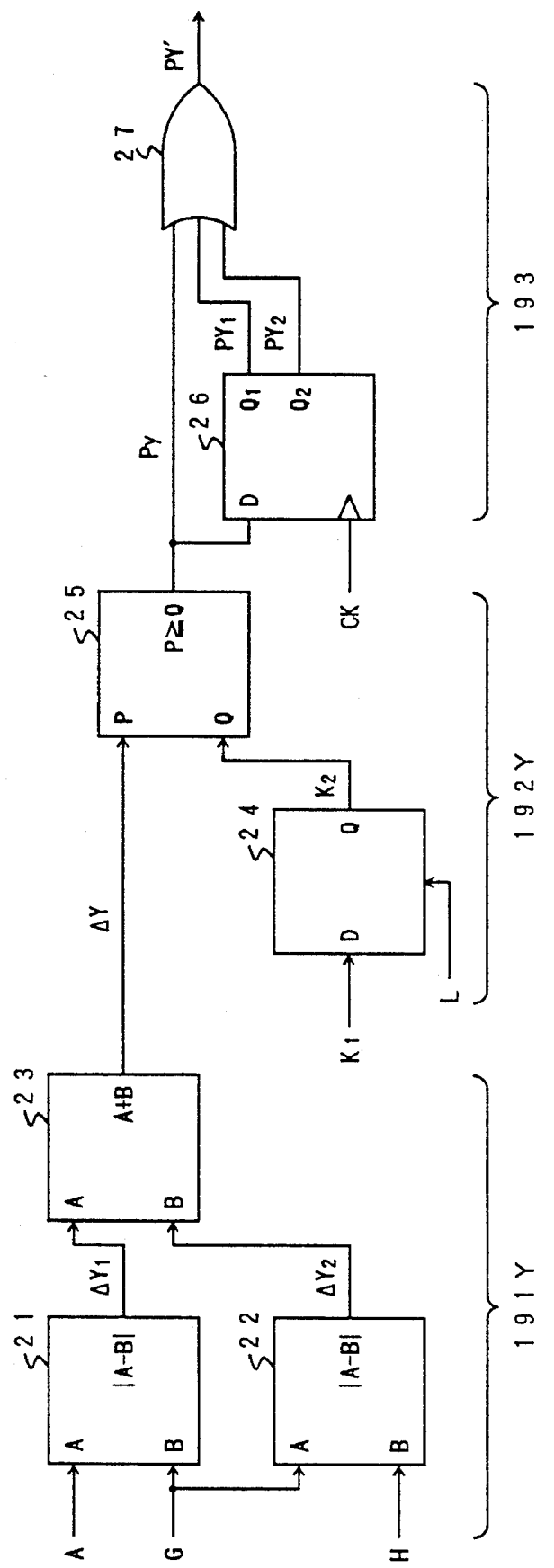
FIG. 13 is a block diagram of a Y variation detector and a first expansion unit shown in FIG. 12.

A description will now be given, with reference to FIG. 13, of a Y-variation-amount detector 191Y, a Y-variation-point detector 192Y, and an expansion unit 193. A subtracter 21 of the Y-variation-amount detector 191Y calculates $_\Delta Y1=|A-G|$, and a subtracter 22 thereof calculates $_\Delta Y2=|G-H|$. An adder 23 of the Y-variation-amount detector 191Y calculates a variation amount $_\Delta Y$ of image data in the sub-scanning direction by using the equation $_\Delta Y= Y1+_\Delta Y2=|A-G|+|G-H|$.

A register 24 of the Y-variation-point detector 192 previously holds an initial value $K_1$. When the dotted-image detection signal L is equal to 0, a value $K_2$ equal to $K_1$ is output. When L=1, the value $K_2$ equal to $(\frac{3}{4})K_1$ is output. A comparator 25 of the Y-variation-point detector 192Y compares the variation amount $_\Delta Y$ in the sub-scanning direction with the value $K_2$, and the variation-point presence/non-presence signal $P_y$ is set equal to 1 when $_\Delta Y \geq K_2$. The reason why the value $K_2$ is varied according to the dotted-image detection signal L is that the sensitivity of detection of a variation point in a dotted-image is made to be different from that in a non-dotted-image so that the $K_2$ is decreased to facilitate detection of the variation-point presence/non-presence signal $P_y$ in a dotted-image.

A shift register 26 of the expansion unit 193 outputs a signal $P_{y1}$ that lags one pixel behind the variation-point presence/non-presence signal $P_y$ in synchronism with a pixel clock CK related to the main scanning direction, and a signal $P_{y2}$ that lags two pixels behind the variation-point presence/non-presence signal $P_y$. An OR gate 27 performs an OR logic operation on the signals $P_y$, $P_{y1}$ and $P_{y2}$, and outputs the operation result $P_y'$.

A description will now be given, with reference to FIG. 14, of an X-variation-amount detector 191X and an X-variation-point detector 192X shown in FIG. 12. A latch 31 of the X-variation-amount detector 191X outputs a signal $A_1$ that lags one pixel behind pixel data A concerning the current line, in synchronism with the pixel clock CK. A subtracter 32 of the detector 191X calculates $_\Delta D=A-A_1$. Initially, an initial value $K_3$ is registered in a register 33. When the dotted-image detection signal L is equal to 0, a value $K_4$ equal to $K_3$ is output. When L=1, the value $K_4$ equal to $(\frac{3}{4})K_3$ is output. The reason why the value $K_4$ is varied is the same as the aforementioned reason regarding detection of the Y-variation-point.

A comparator 34 compares the output $_\Delta D$ of the subtracter 32 with the value $K_4$. When $_\Delta D>K_4$, the comparator 34 outputs a signal PQ equal to 1. An AND circuit 35 illustrated in FIG. 15 in detail outputs, as a variation amount $_\Delta X$ with respect to the main scanning direction, the output $_\Delta D$ of the subtracter 32 to the X-variation-point detector 192X when PQ=1, and "0" when PQ=0.

Figure 15:
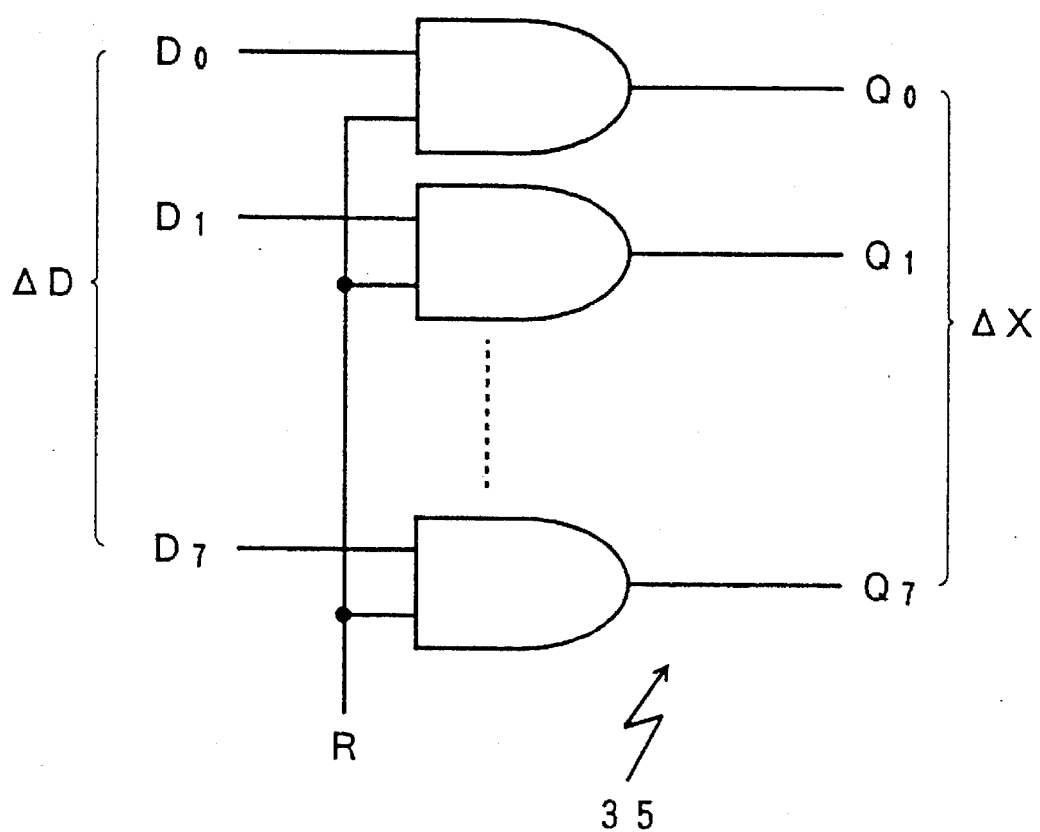
FIG. 15 is a block diagram of an AND circuit shown in FIG. 14.

The AND circuit 35 is intended to prevent the shift register 36 and the peak detection circuit 37 of the X-variation-point detector 192X from detecting a peak (that is, an X-variation point) when the output $_\Delta D$ of the subtracter 32 is small. As shown in FIG. 15, the AND circuit 35 performs respective AND operations on the signal PQ and the eight bits $D_0$–$D_7$ of the output $_\Delta D$ of the subtracter 32, and eight bits of the AND operation results in parallel are obtained.

Figure 14:
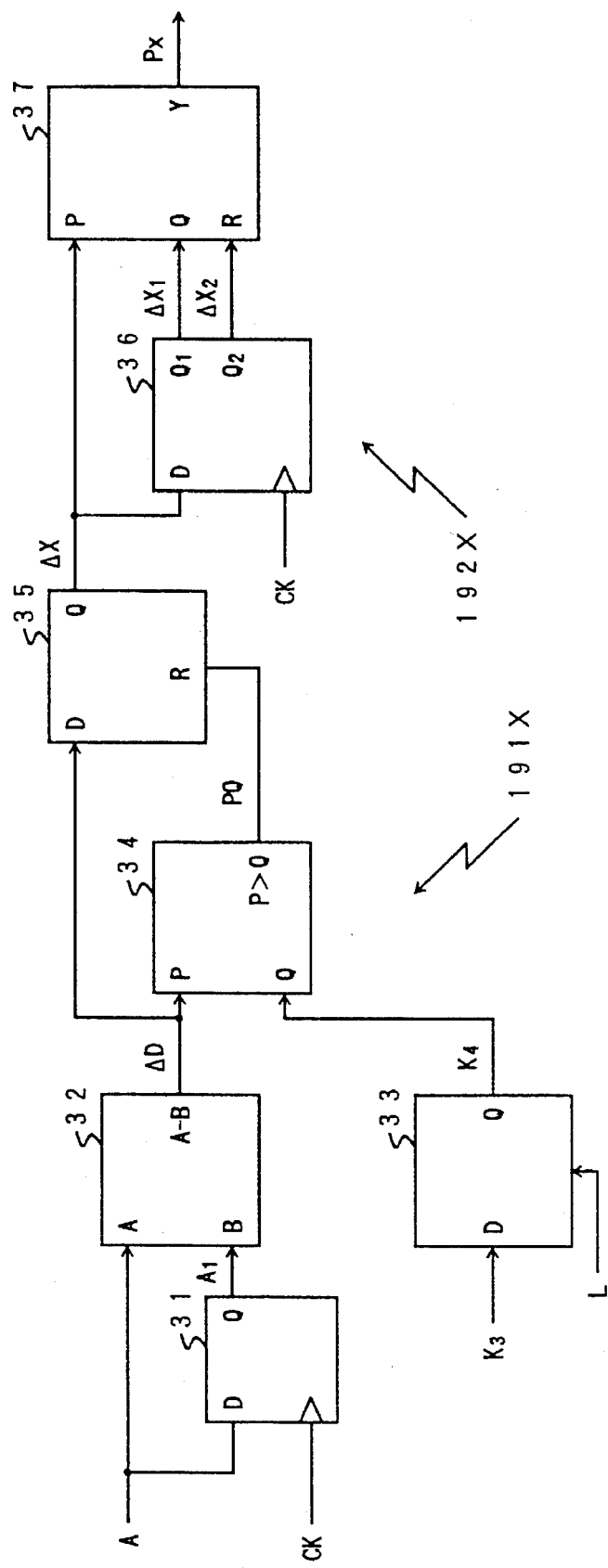
FIG. 14 is a block diagram of an X variation detector shown in FIG. 12.

The shift register 36 of the X-variation-point detector 192X shown in FIG. 14 outputs a signal $_\Delta X_1$ that lags one pixel behind data of the variation amount $_\Delta D$, and a signal $_\Delta X_2$ that lags two pixels behind the data of the variation amount $_\Delta D$. A peak detection circuit 37 compares the three variation amounts $_\Delta X$, $_\Delta X_1$ and $_\Delta X_2$, and outputs a variation-point presence/non-presence signal $P_x$ when $_\Delta X<_{66} X_1>_\Delta X_2$, that is, when a peak of the variation $_\Delta X$ is detected.

Figure 16:
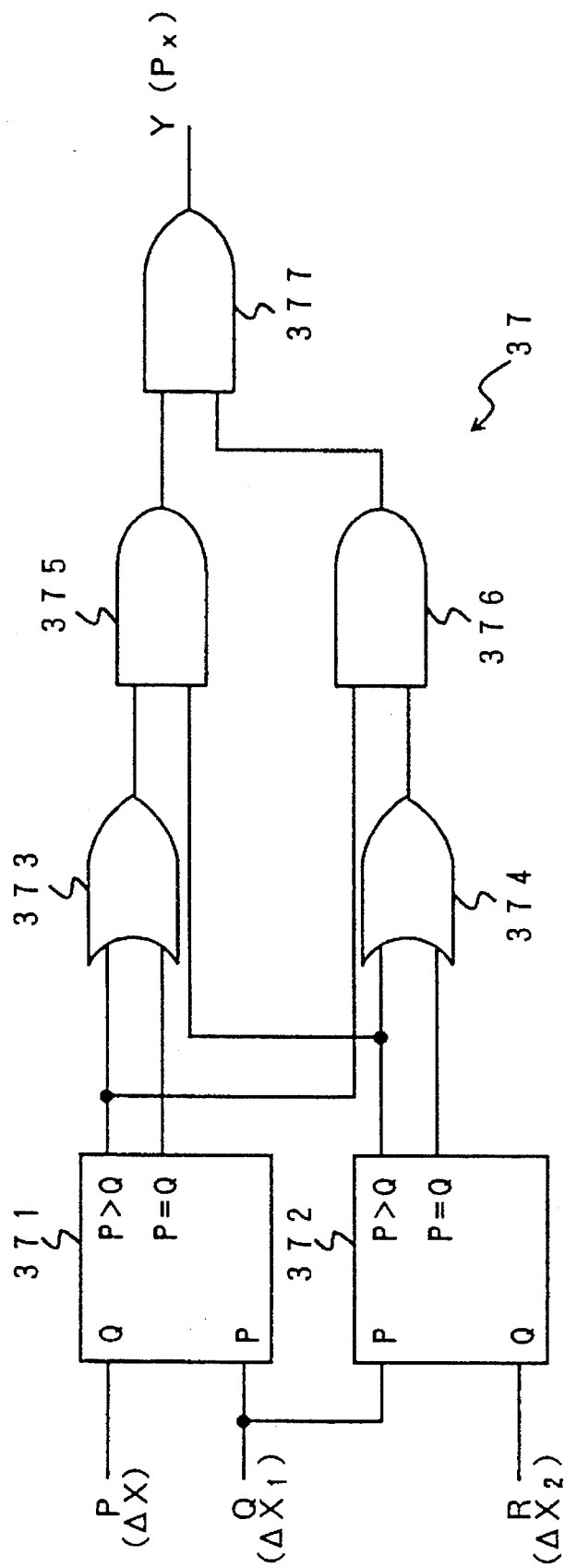
FIG. 16 is a block diagram of a peak detector shown in FIG. 14.

Referring to FIG. 16, a comparator 371 of the peak detection circuit 37 compares the variation amounts $_\Delta X$ and $_\Delta X_1$ with each other, and a comparator 372 thereof compares the variation amounts $_\Delta X_1$ and $_\Delta X_2$ with each other. An OR gate 373 and an AND gate 375 detects $_\Delta X<_\Delta X_1$, and an OR gate 374 and an AND gate 376 detects $_\Delta X_1>_\Delta X_2$. Hence, an AND gate 377 outputs the signal $P_x$ equal to 1 when $_\Delta X<_\Delta X_1>_\Delta X_2$.

As has been described previously, the output P of the AND gate 194 switches to 1 when data is other than the white background and when expansion of the Y-variation-point occurs and an X-variation point is detected.

Figure 17:
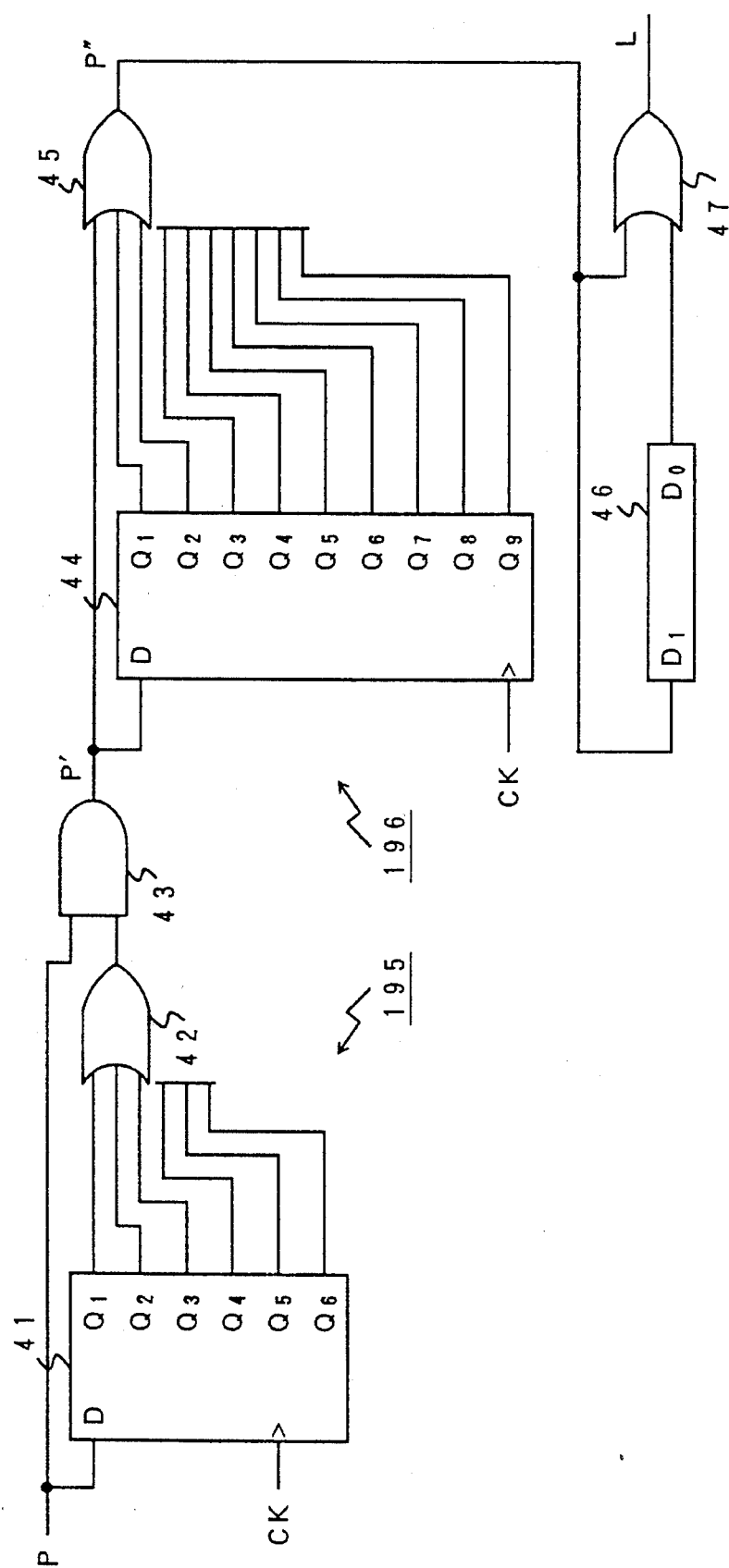
FIG. 17 is a block diagram of a density detector and a second expansion unit shown in FIG. 12.

A description will now be given, with reference to FIG. 17, of the density detector 195 and the expansion unit 196. The density detector 195 is made up of a shift register 41, an OR gate 42 and an AND gate 43. The output signal P' of the AND gate 43 is equal to 1 when P=1 and at least one pixel of P=1 is present within six consecutive pixels from the above pixel of P=1. The OR gate 42, which receives the signal P, is connected to output terminals Q1–Q6 of the shift register 41.

The expansion unit 196 is made up of a shift register 44, an OR gate 45, a line memory 46 and an AND gate 47. The shift register 44 and the OR gate 45 generate a signal P" obtained by expanding (repeatedly outputting) the pixel of P'=1 by an amount equal to nine pixels in the main scanning direction. For example, with respect to one pixel of P'=1, P"=1 stands for ten pixels. Then, the line memory 46 and the AND gate 47 expand a pixel of P"=1 by an amount equal to one line in the sub-scanning direction. In the above manner, the dotted-image detection signal L is generated and is applied to the detectors 192X and 192Y shown in FIG. 12. The OR gate 45, which receives the signal P', is connected to output terminals Q1–Q9 of the shift register 44.

Figure 18:
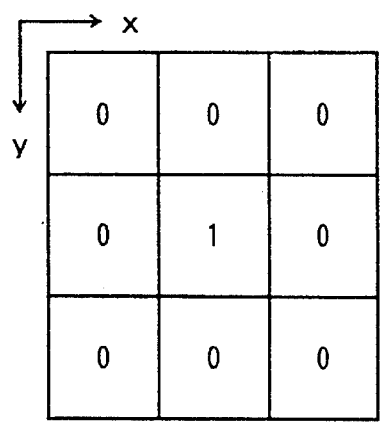
FIG. 18 is a diagram showing a process in which a smoothing filter is not used.
Figure 19:
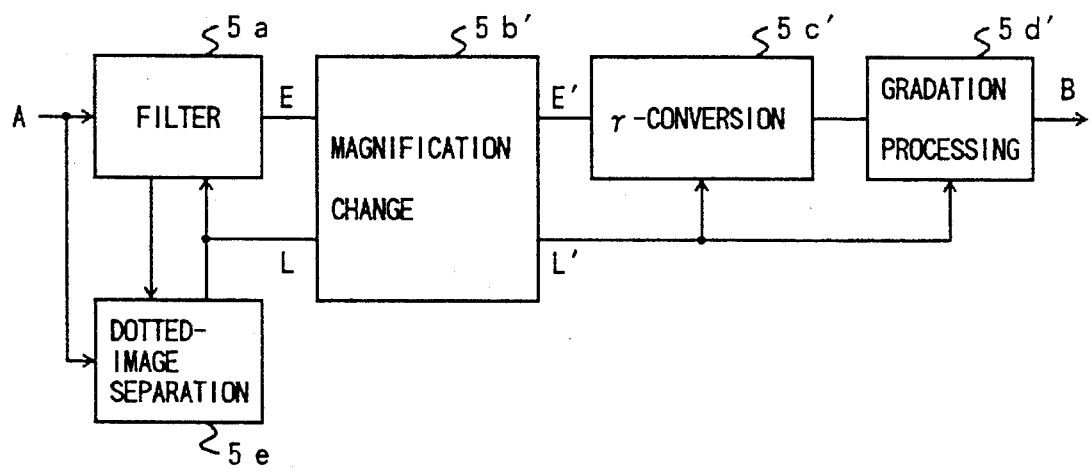
FIG. 19 is a block diagram of a variation of the image processing part shown in FIG. 4.
Figure 20:
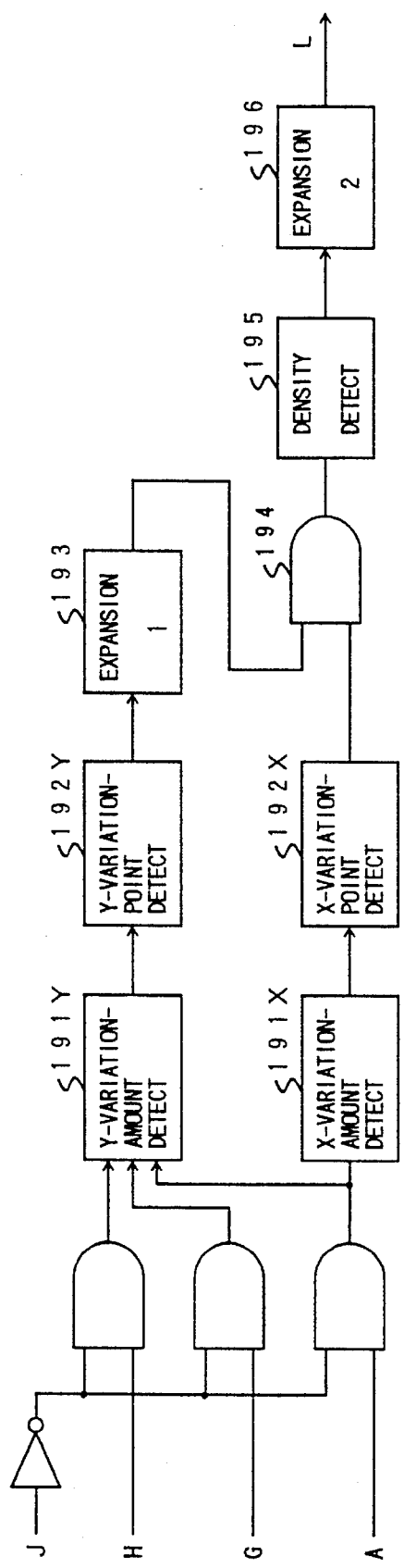
FIG. 20 is a block diagram of a variation of a dotted-image detector shown in FIG. 12.

In the above-embodiment of the present invention, the dotted-image area is smoothed by the smoothing filter 13. Alternatively, as shown in FIG. 18, it is possible to directly output data of the dotted-image area without smoothing. In the above-mentioned embodiment, only the smoothing process is influenced by the presence of a dotted-image area is carried out. Alternatively, as shown in FIG. 19, it is possible to change the processes of not only the smoothing filter 5a but also a gamma-conversion unit 5c' and a gradation processing unit 5d' in accordance with a dotted-image area detection signal L'. Further, in the above-mentioned embodiment of the present invention, the dotted-image detection circuit 19 shown in FIG. 12 gates the expansion signal $P_y'$ as regards in the sub-scanning direction and the variation-point presence/non-presence signal $P_x$ as regards the main scanning direction in accordance with the white-background detection signal J. Alternatively, as shown in FIG. 20, it is possible to directly gate the image data H, G and A equal to three lines in accordance with the white-background detection signal H. Further, various variations of the white-background detector 18 can be made.

The present invention is not limited to the specifically disclosed embodiments, and variations and modifications may be made without departing from the scope of the present invention.

What is claimed is:

1. An image processing apparatus, comprising:
   a) variation point detecting means for detecting when pixels vary so that both conditions 1 and 2 are met:

1) density differences between neighboring pixels change in the following order:
   i) a first value representing a first density difference computed between a first pair of neighboring pixels which are encountered first;
   ii) a second value representing a second density difference computed between a second pair of neighboring pixels which are encountered second, after the first pair of neighboring pixels; and
   iii) a third value representing a third density difference computed between a third pair of neighboring pixels which are encountered third, after the second pair of neighboring pixels; and
2) the second value representing the second density difference is greater than both the first value representing the first density difference and the third value representing the third density difference;

b) density detecting means for detecting, as a dotted-image area, an arrangement in which the pixels, which are detected by the variation point detecting means, are spaced apart from each other at an interval which is less than or equal to a predetermined number of pixels; and c) smoothing processing means for performing a smoothing operation on densities of the pixels having the arrangement detected by the density detecting means.

2. The apparatus of claim 1, wherein the density detecting means for detecting an arrangement as a dotted-image area includes:

means for detecting a first arrangement part in a main scanning direction and a second arrangement part in a sub-scanning direction so that the detecting is provided in both the main scanning direction and the sub-scanning directions.

3. The apparatus of claim 1, further comprising:

white-background-area detecting means for detecting, from data values of pixels, a white-background-area, and for preventing the density detecting means from detecting the arrangement when such a white-background-area is detected.

4. An image processing method comprising:

a) detecting when pixels vary so that both conditions 1 and 2 are met:
1) density differences between neighboring pixels change in the following order:
   i) a first value representing a first density difference computed between a first pair of neighboring pixels which are encountered first;
   ii) a second value representing a second density difference computed between a second pair of neighboring pixels which are encountered second, after the first pair of neighboring pixels; and
   iii) a third value representing a third density difference computed between a third pair of neighboring pixels which are encountered third, after the second pair of neighboring pixels; and
2) the second value representing the second density difference is greater than both the first value representing the first density difference and the third value representing the third density difference;

b) detecting, as a dotted-image area, an arrangement in which the pixels, which are detected by the detecting step a), are spaced apart from each other at an interval which is less than or equal to a predetermined number of pixels; and c) performing a smoothing operation on densities of the pixels having the arrangement detected by the density detecting means.

5. The method of claim 4, wherein the density detecting step b) for detecting an arrangement as a dotted-image area includes:

detecting a first arrangement part in a main scanning direction and a second arrangement part in a sub-scanning direction so that the detecting of the arrangement is performed in both the main scanning direction and the sub-scanning directions.

6. The method of claim 4, further comprising:

detecting, from data values of pixels, a white-background-area, and preventing the density detecting step b) from detecting the arrangement when such a white-background-area is detected.

* * * * *